(12) United States Patent
Barata

(10) Patent No.: US 10,989,487 B2
(45) Date of Patent: Apr. 27, 2021

(54) HEAT EXCHANGER

(71) Applicant: JOÃO DE DEUS & FILHOS, S.A., Samora Correia (PT)

(72) Inventor: Pedro Barata, Samora Correia (PT)

(73) Assignee: JOÃO DE DEUS & FILHOS, S.A., Samora Correia (PT)

( * ) Notice: Subject to any disclaimer, the term of this patent is extended or adjusted under 35 U.S.C. 154(b) by 73 days.

(21) Appl. No.: 16/390,146

(22) Filed: Apr. 22, 2019

(65) Prior Publication Data
US 2019/0346218 A1 Nov. 14, 2019

(30) Foreign Application Priority Data

May 9, 2018 (EP) .................................... 18398005

(51) Int. Cl.
*F28F 9/02* (2006.01)
*F28D 7/00* (2006.01)
*F28F 1/14* (2006.01)

(52) U.S. Cl.
CPC .......... *F28F 9/0275* (2013.01); *F28D 7/0025* (2013.01); *F28F 1/14* (2013.01)

(58) Field of Classification Search
CPC .......... F28F 9/0275; F28F 9/001; F28F 9/005; F28F 9/02; F28F 9/0263; F28F 9/0278; F28F 9/013; F28F 9/0131; F28F 9/0135; F28F 9/0202; F28F 9/0246; F28F 1/14; F28F 1/10; F28F 1/12; F28F 1/08; F28F 1/006; F28F 19/002; F28F 2009/0297; F28F 2275/04; F28D 7/1684; F28D 7/0025; F28D 7/16; F28D 7/0008; F28D 2021/0082; F02B 29/0462
USPC .................................................. 165/150, 151
See application file for complete search history.

(56) References Cited

U.S. PATENT DOCUMENTS

| | | | |
|---|---|---|---|
| 2015/0068715 A1 * | 3/2015 | Raver | B21D 53/085 165/151 |
| 2017/0122678 A1 * | 5/2017 | Richter | F28F 9/001 |

FOREIGN PATENT DOCUMENTS

| | | |
|---|---|---|
| WO | 2013022072 A1 | 2/2013 |
| WO | 2017122832 A1 | 7/2017 |
| WO | WO-2017122832 A1 * | 7/2017 ............. F28D 1/053 |

* cited by examiner

*Primary Examiner* — Henry T Crenshaw
*Assistant Examiner* — Kamran Tavakoldavani
(74) *Attorney, Agent, or Firm* — Arent Fox LLP; Michael Fainberg

(57) ABSTRACT

Disclosed a heat exchanger comprising: a plurality of parallel tubes for conveying a first fluid, a pair of header plates, each having a plurality of openings into which respective ends of the tubes are inserted in a fluid-tight manner, a jacket connected to the header plates in a fluid-tight manner and defining with the header plates an inner volume for receiving a second fluid, the tubes being placed within the inner volume, and a fluid channel joined to a wall of the jacket, the fluid channel being in fluid communication with the inner volume through an opening formed through the wall, wherein the wall is, on an opposite side relative to the fluid channel, joined to sidewalls of said tubes.

5 Claims, 5 Drawing Sheets

HEAT EXCHANGER

CROSS-REFERENCE TO RELATED APPLICATIONS

This application claims priority to European Patent Application No. 18398005.1 filed on May 9, 2019, the entire contents of which is hereby incorporated by reference

FIELD OF TECHNOLOGY

The present invention relates generally to heat exchangers, particularly for automotive applications.

BACKGROUND OF THE INVENTION

Automotive heat exchangers include, for example, water charge air coolers (WCAC) used in intake systems of internal combustion engines. In these WCACs, a water-based mixture is circulated through the jacket of the WCAC, which is connected to a water circuit. The water-based mixture passing through the jacket is used to cool down a gaseous fluid (air or gaseous mixture) conveyed by the tubes of the heat exchanger towards the intake system of the internal combustion engine.

In this type of heat exchangers, a week point of the water circuit is the inlet and outlet of the coolant side, i.e. at inlet and outlet openings formed through respective walls of the jacket. In particular, it has been detected that the stress level on the tubes is highest on the areas of the inlet and outlet openings where no jacket is covering the tubes. Furthermore, these areas where no jacket is covering the tube are exposed to coolant flow, which promotes the erosion of the tubes in these areas.

SUMMARY

An aim of the present invention is to provide a heat exchanger configuration which can overcome these drawbacks of the known heat exchangers.

Accordingly, the invention proposes a heat exchanger comprising: a plurality of parallel tubes for conveying a first fluid, a pair of header plates, each having a plurality of openings into which respective ends of the tubes are inserted in a fluid-tight manner, a jacket connected to the header plates in a fluid-tight manner and defining with the header plates an inner volume for receiving a second fluid, said tubes being placed within said inner volume, and a fluid channel joined to a wall of the jacket, said fluid channel being in fluid communication with said inner volume through an opening formed through said wall, wherein said wall is, on an opposite side relative to the fluid channel, joined to sidewalls of said tubes, and wherein said wall of the jacket comprises a plurality of tube covering extensions extending between opposite edges of said opening and defining a plurality of slots alternating with the tube covering extensions, each tube covering extension being joined to a respective sidewall of a respective tube.

With this configuration, the jacket is covering the tubes in their entire length, including the inlet/outlet opening areas as well. This eliminates any transition between covered areas and non-covered areas of the tubes, which otherwise would lead to stress concentration. Furthermore, it is the jacket that will be preferably eroded, instead of the tubes, at the inlet/outlet opening areas. This increases the lifespan of the tubes, protecting against leaks between the coolant and the air circuit.

BRIEF DESCRIPTION OF THE DRAWINGS

A preferred, but non-limiting, embodiment of the invention will now be described with reference to the attached drawings, in which.

DETAILED DESCRIPTION

Figure 1:
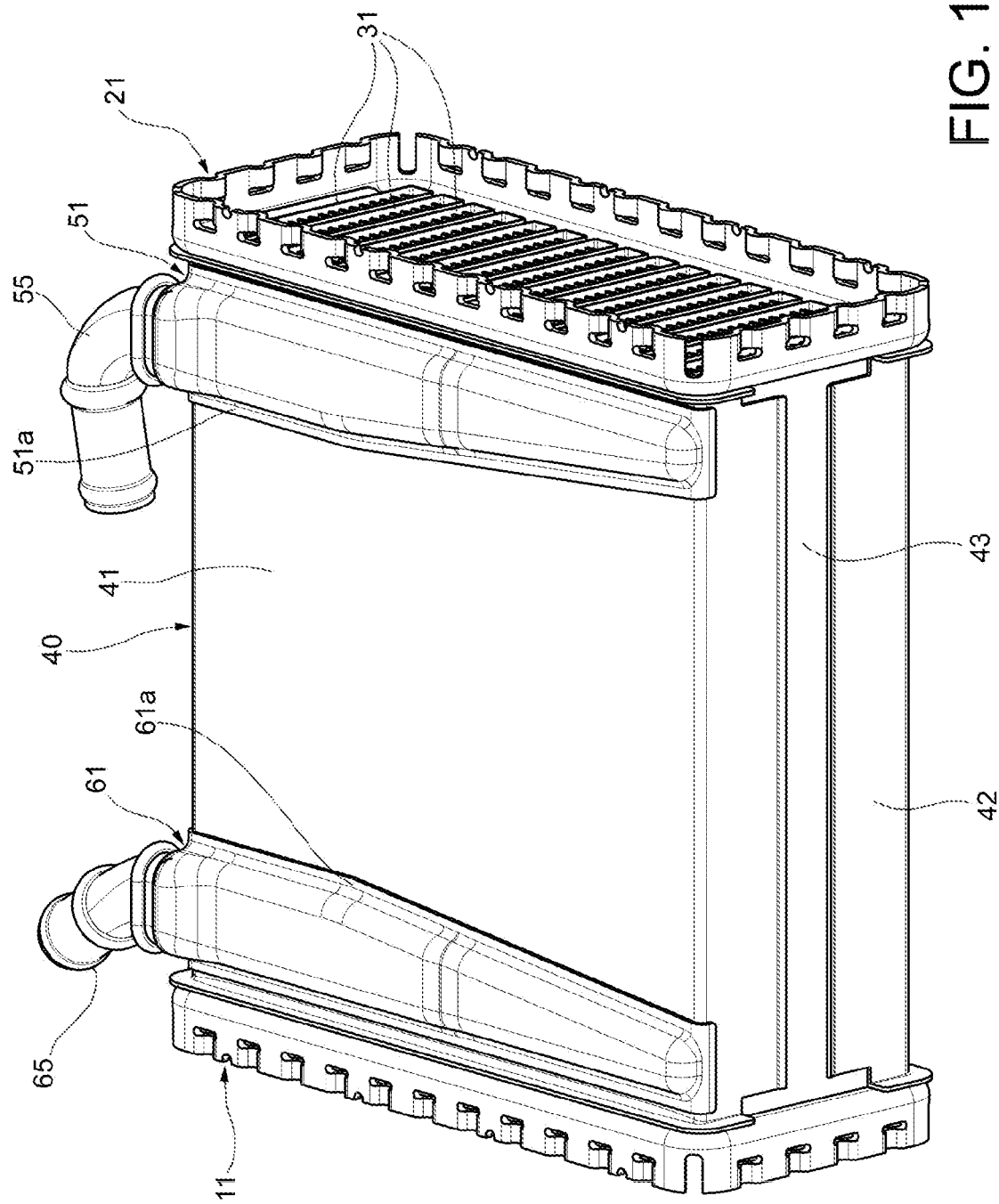
FIG. 1 is a perspective view showing a heat exchanger according to the invention.
Figure 2:
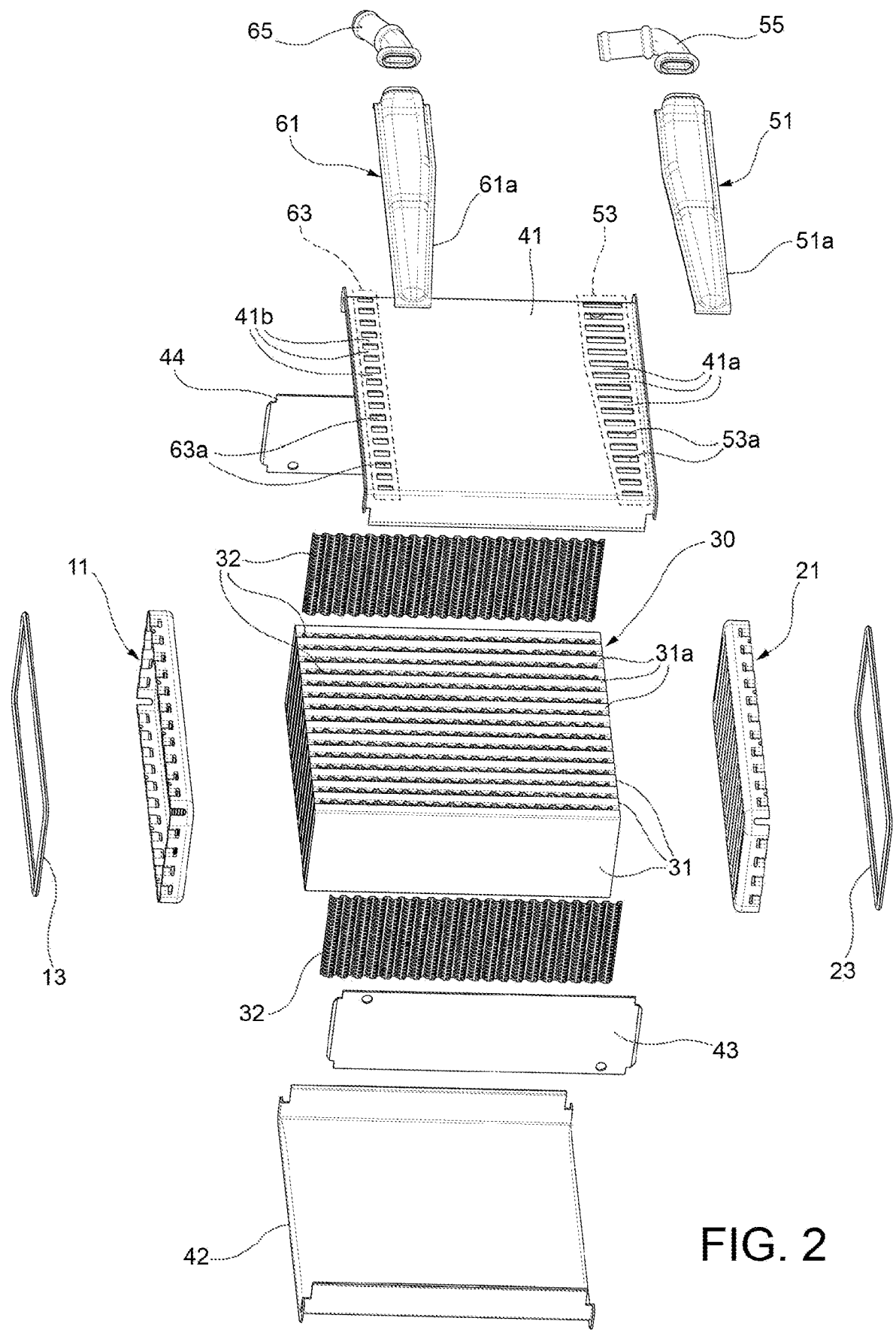
FIG. 2 is an exploded view of the heat exchanger of FIG. 1.
Figure 3:
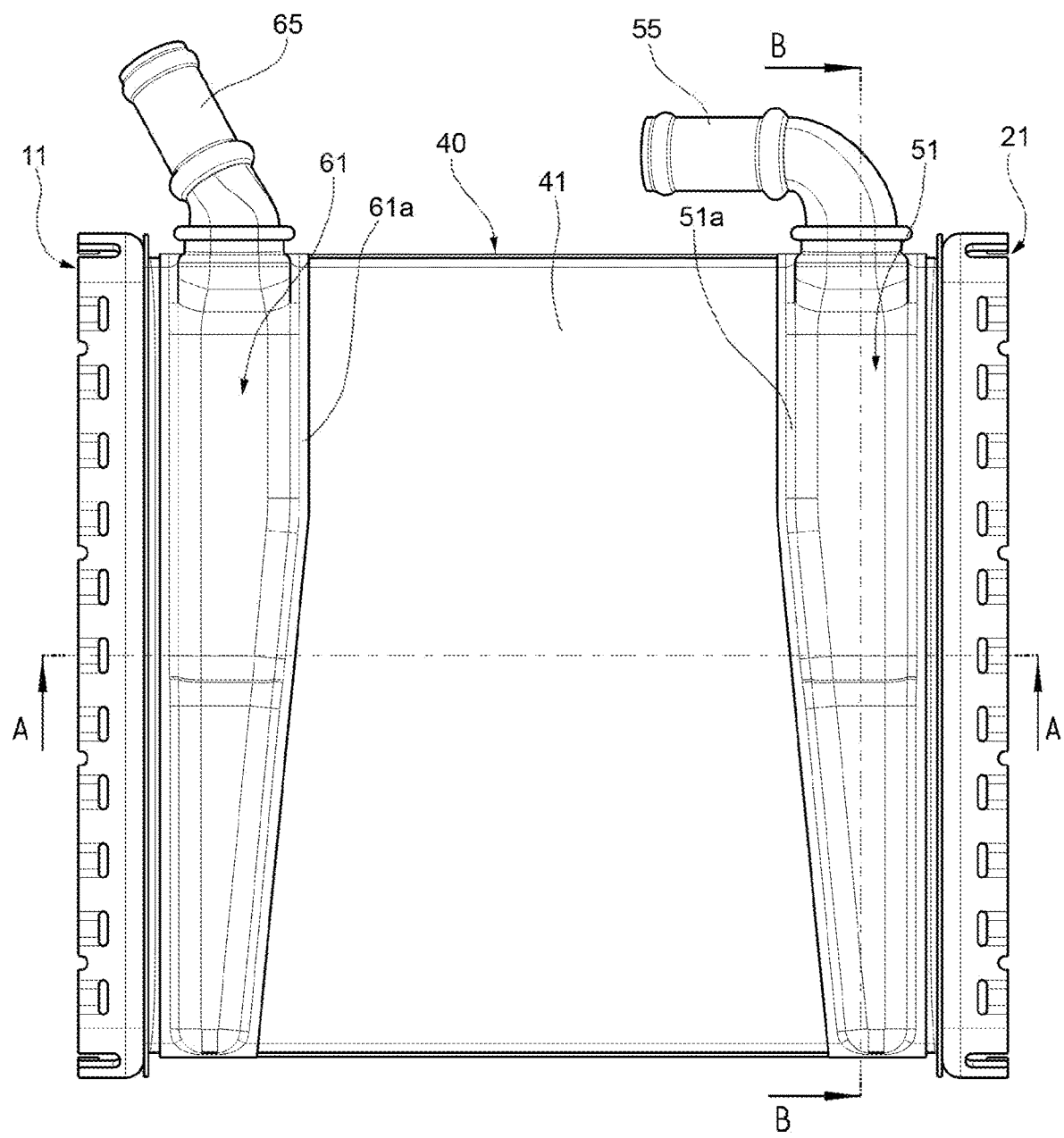
FIG. 3 is a plan view of the heat exchanger of FIG. 1.

A heat exchanger, such as for example a water charge air cooler, is shown in the drawings. The heat exchanger comprises an inlet header plate 11 and an outlet header plate 21, both of metal material, such as for example aluminium. These header plates 11 and 21 are intended to be connected in a known way to an inlet header tank (not shown) and to an outlet header tank (not shown), respectively. FIG. 2 also shows gaskets 13 and 13 for sealing connections between the header plates and the respective header tanks.

The heat exchanger 1 further comprises a core 30 comprising a plurality of parallel flat tubes 31 extending between the header plates 11 and 21. The tubes 31 are of metal material, such as for example aluminium. Each tube 31 has opposite ends inserted into openings or slots formed in one or the other of the header plates 11, 21, respectively. Each tube 31 has an approximately rectangular cross-section, and comprises a pair of opposite long sidewalls and a pair of opposite short sidewalls which interconnect the long sidewalls and are shorter than the long sidewalls. In the drawings, only one of the short sidewalls is designated with a reference number, 31a.

A first fluid, particularly a gaseous fluid such as, for example, air or a gaseous mixture, is designed to flow from the inlet header tank of the heat exchanger, through the fluid connections between the inlet header plate 11 and tubes 31, to the outlet header tank of the heat exchanger, through the fluid connections between the tubes 31 and outlet header plate 21. Through the inlet and outlet header tanks, the heat exchanger can be connected to a fluid circuit for the first fluid (not shown), comprising for example an intake system of an internal combustion engine.

A second fluid, particularly a liquid coolant such as, for example, water or a water-based mixture, is designed to flow around the core 30 and through gaps between the tubes 31, and exchange heat with the first fluid flowing into the tubes 31. Finned plates 32 are arranged into the gaps between the tubes 31, as well as adjacent to tubes 31 at opposite ends of the core 30.

The heat exchanger further comprises a jacket 40 of metal material, such as for example aluminium. The jacket 40 is connected to the header plates 11 and 21 in a fluid-tight manner and defines with the header plates 11 and 21 an inner volume for receiving/conveying the second fluid. The tubes 31 are placed within this inner volume formed by the jacket 40 and the header plates 11 and 21.

In the embodiment shown in the drawings, the jacket 40 has a rectangular cross-section and comprises a pair of opposite first walls 41 and 42 and a pair of opposite second walls 43 and 44 interconnecting the first walls 41 and 42.

The walls 41-44 are connected to each other and to the header plates 11, 21 in a conventional manner.

Figure 4:
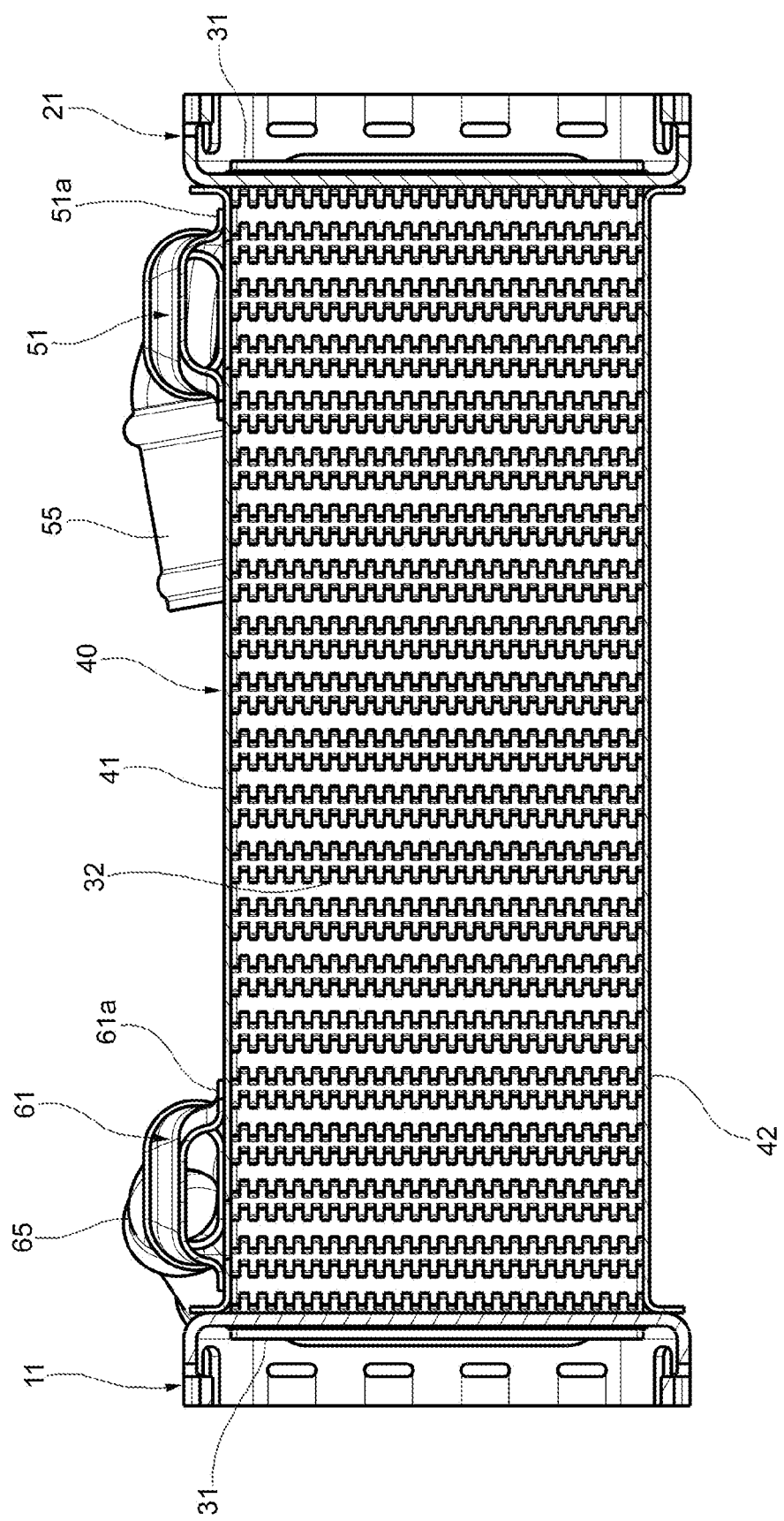
FIG. 4 is a cross-sectioned view taken along the line A-A of FIG. 3.

The heat exchanger further comprises an inlet fluid channel 51 and an outlet fluid channel 61 for conveying the second fluid to and from the inner volume formed by the jacket 40 along with the header plates 11, 21. Both fluid channels 51, 61 are of metal material, such as for example aluminium. Each fluid channel 51, 61 is joined to a wall of the jacket 40. In the example shown in the drawings, both fluid channels 51, 61 are joined to one of the first walls, 41, of the jacket 40. In the example shown in the drawings, each fluid channel 51, 61 is formed as an elongate, concave shell, whose rim 51a, 61a is joined to the wall 41 of the jacket 40 (see FIGS. 4 and 5). Therefore, the concave side of each fluid channel 51, 61 faces towards the wall 41 of the jacket 40.

Figure 5:
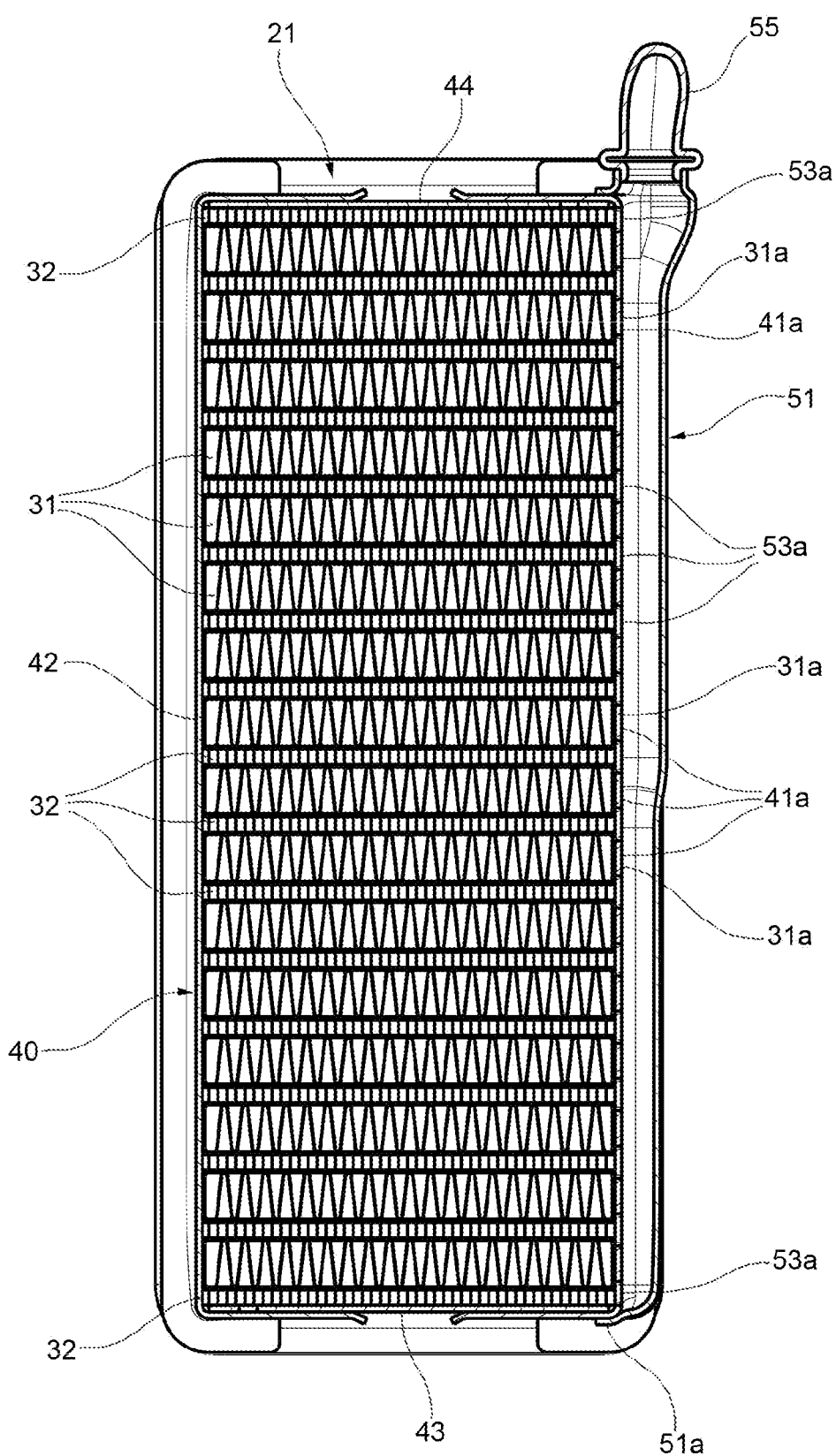
FIG. 5 is a cross-sectioned view taken along the line B-B of FIG. 3.

Each fluid channel 51, 61 is in fluid communication with the inner volume of the jacket 40 through a respective opening 53, 63 formed through the wall 41 of the jacket 40. As shown in FIG. 5, at least this wall 41 is, on an opposite side relative to the fluid channels 51 and 61, joined to the short sidewalls 31a of the tubes 31. More generally, and as shown in FIG. 5, all walls 41-44 of the jacket 40, particularly the first walls 41, 42, can be joined to sidewalls of the tubes 31, particularly to the short sidewalls of the tubes 31.

FIG. 2 also shows inlet and outlet fluid connectors, 55 and 65, which are fixed to the inlet fluid channel 51 and the outlet fluid channel 61, respectively, to connect the heat exchanger to a fluid circuit for the second fluid (not shown), such as for example a liquid coolant circuit.

According to an embodiment, the tubes 31, header plates 11 and 21, and jacket 40 are joined to each other, fluid channels 51 and 61 are joined to the jacket 40, and connectors 55 and 65 are joined to the fluid channels 51 and 61 in a conventional manner, particularly by brazing.

With reference to FIGS. 2 and 5, the first wall 41 of the jacket 40 through which the openings 53 and 63 are formed comprises, at each opening 53, 63, a plurality of tube covering extensions 41a, 41b, extending between opposite edges of the opening 53, 63. Therefore, at each opening 53, 63 the tube covering extensions 41a, 41b define a plurality of slots 53a, 63a alternating with the tube covering extensions 41a, 41b. Each tube covering extension 41a, 41b is joined to a respective sidewall 31a of a respective tube 31. In this way, each tube 31 is covered by the wall 41 of the jacket over its entire length comprised between the header plates 11, 21, including its portions at the openings 53 and 63 where the tube 31 is covered by the respective tube covering extensions 41a, 41b of the jacket 40. Particularly, each tube covering extension 41a, 41b is brazed to the sidewall 31a of the respective tube 31 along with the whole jacket 40.

On the other hand, each slot 53a, 63a is overlapping with a respective gap between adjacent tubes 31, or between a tube 31 and a second wall 43, 44 of the jacket 40, in order to allow fluid communication between the inner volume of the jacket 40 and the fluid channels 51, 61.

The tube covering extensions 41a, 41b are formed in one piece with the wall 41 of the jacket 40. They can be obtained, for example, through a punching process applied to a metal sheet from which the wall 41 of the jacket 40 is to be formed, and through which metal sheet portions corresponding to the slots 53a and 63a are removed.

The invention claimed is:

1. A heat exchanger comprising:
   a plurality of parallel tubes for conveying a first fluid, said plurality of parallel tubes comprising a plurality of sidewalls;
   a pair of header plates, each having a plurality of openings into which respective ends of the tubes are inserted in a fluid-tight manner;
   a jacket connected to the header plates in a fluid-tight manner and defining with the header plates an inner volume for receiving a second fluid, said tubes being placed within said inner volume; and
   a fluid channel joined to a wall of the jacket, said fluid channel being in fluid communication with said inner volume through an opening formed through said wall, wherein said wall is, on an opposite side relative to the fluid channel, joined to said plurality of sidewalls,
   wherein said wall of the jacket comprises a plurality of tube covering extensions extending between opposite edges of said opening and defining a plurality of slots alternating with the tube covering extensions, each tube covering extension being joined to a respective sidewall of the plurality of sidewalls and to a respective tube of said plurality of parallel tubes.

2. The heat exchanger according to claim 1, wherein a plurality of gaps are defined which alternate with said tubes, and wherein each slot is overlapping with a respective gap to allow fluid communication between said inner volume of the jacket and the fluid channel.

3. The heat exchanger according to claim 1, wherein said wall of the jacket and said tube covering extensions are brazed to said plurality of sidewalls.

4. The heat exchanger according to claim 1, wherein said fluid channel is brazed to said wall of the jacket.

5. The heat exchanger according to claim 1, wherein said first fluid is a gaseous fluid and said second fluid is a liquid coolant, wherein said tubes are configured to convey the gaseous fluid, and wherein said jacket is configured to receive the liquid coolant.

* * * * *